United States Patent [19]
Hoffmann et al.

[11] 3,980,160
[45] Sept. 14, 1976

[54] PARTIAL LINING DISK BRAKE, ESPECIALLY FOR MOTOR VEHICLES

[75] Inventors: Friedrich Hoffmann; Wilhelm von Kamp, both of Stuttgart, Germany

[73] Assignee: Daimler-Benz Aktiengesellschaft, Germany

[22] Filed: Jan. 11, 1974

[21] Appl. No.: 432,512

[30] Foreign Application Priority Data
Jan. 13, 1973  Germany............................ 2301595

[52] U.S. Cl................................ 188/73.5; 188/73.3
[51] Int. Cl.² ......................................... F16D 65.02
[58] Field of Search................. 188/71.1, 72.4, 72.5, 188/73.3, 73.5, 73.6

[56] References Cited
UNITED STATES PATENTS

| | | | |
|---|---|---|---|
| 3,261,430 | 7/1966 | Wilson et al. | 188/73.6 |
| 3,478,845 | 11/1969 | Kita | 188/73.3 |
| 3,592,301 | 7/1971 | Auth | 188/73.6 |
| 3,708,043 | 1/1973 | Rath et al. | 188/73.3 |

FOREIGN PATENTS OR APPLICATIONS
1,361,922  4/1964  France.............................. 188/73.3

Primary Examiner—George E. A. Halvosa
Attorney, Agent, or Firm—Craig & Antonelli

[57] ABSTRACT

A partial lining disk brake, especially for motor vehicles, with a U-shaped brake housing externally surrounding the brake disk and with hydraulically actuated brake cushions arranged on each side of the brake disk which are axially displaceably supported at guide members, preferably with the aid of their lining carriers; each brake cushion is thereby supported at two guide members which are arranged in the center plane of the brake cushion extending through the brake disk axis, whereby one guide member engages with the brake cushion from the outside as viewed in the radial direction while the other engages with the brake cushion from the inside.

8 Claims, 11 Drawing Figures

PARTIAL LINING DISK BRAKE, ESPECIALLY FOR MOTOR VEHICLES

The present invention relates to a partial lining disk brake, especially for motor vehicles, with a U-shaped brake housing externally surrounding the brake disk and with hydraulically actuated brake cushions arranged on each side of the brake disk which, preferably with the aid of their lining carriers or supports, are axially displaceably supported at least at one guide member retained directly or indirectly at the brake housing or formed by the latter.

For the support or bracing of the brake force, brake linings of disk brakes of customary construction have large lateral support surfaces which have to absorb all of the forces. Moments now act on brake linings supported in such a manner which lead to an inclined wear of the brake linings. In order to prevent this inclined or oblique wear, the pressure pistons are partially milled off in the prior art constructions of disk brakes at their ring-shaped abutment surfaces on the brake lining so that the piston force engages eccentrically. The moments, which lead to the inclined or angular wear of the brake linings, are to be compensated for by such an arrangement. However, the disadvantages have to be accepted thereby which reside in that wedging forces occur between piston and cylinder wall and a precisely opposite effect occurs during the braking while driving backwards. Additionally, different brakes have to be readied for the right and the left side of the vehicle. Moreover, the only partially supporting ring surface of the piston causes an inclined positioning thereof within the cylinder. The squeaking tendency of the lining during braking while driving in the reverse direction is still further increased by the eccentric engagement of the piston force on the brake linings.

It is the aim of the present invention to avoid these disadvantages and to ensure that the moments which act on the lining during braking, are again compensated for by the type of the suspension of the brake linings.

The underlying problems are solved according to the present invention in that each brake cushion or pad is supported at two guide members which are arranged in the center plane of the brake cushion or pad extending through the brake disk axis, and of which one engages at the brake cushion or pad from the outside as viewed in the radial direction while the other engages at the brake cushion or pad from the inside.

According to a further feature of the present invention the inner guide member, as viewed in the radial direction, can be formed by a tongue of the housing projecting in the direction toward the brake disk whereas the outer guide member is detachably secured at the brake housing —overlapping the brake disk— and both guide members engage in apertures or recesses provided internally and externally at the brake cushion. Also, in a floating saddle brake or floating caliper brake, the inner guide member can be formed by a projecting tongue of the floating saddle, possibly also by a groove provided in the brake saddle, whereas the outer guide member is detachably secured at the floating saddle.

In an appropriate embodiment of the present invention, the outer guide member, as viewed in the radial direction, may consist of a bolt which is extended in the axial direction of the brake disk through mutually aligned bores arranged one behind the other in the brake housing and in the brake lining and is secured against a falling out. A leaf spring engaging the bolt from below may thereby be arranged over each brake lining, whose free ends press against lateral end surfaces of the brake cushion.

In another embodiment according to the present invention, the outer guide member, as viewed in the radial direction, may be inserted apertures or recesses in the brake housing which are aligned with the aperture or recess in the brake lining, and may be secured against a falling out by a leaf spring fastened at the guide member, which with its free ends engages underneath pins which are removably inserted into the housing—extending through the same in the axial direction. Such a solution is also applicable to floating saddle brakes whereby the pins, however, are appropriately inserted into bores provided in the floating saddle.

Accordingly, it is an object of the present invention to provide a partial lining disk brake, especially for motor vehicles, which avoids by simple means the aforementioned shortcomings and drawbacks encountered in the prior art.

Another object of the present invention resides in a partial lining disk brake in which uniform wear of the brake linings is assured by an effective and simple compensation of the moments acting on the brake lining.

A further object of the present invention resides in a partial lining disk brake in which wedging or jamming forces between piston and cylinder wall do not occur and in which the same braking behavior is assured regardless of whether driving in the forward or backward direction while braking.

Still another object of the present invention resides in a partial lining disk brake in which the same brakes can be used for the right and left side of the vehicle.

A still further object of the present invention resides in a partial lining disk brake in which the tendency to squeak is mimimized, especially when braking while driving in the backward direction.

These and other objects, features, and advantages of the present invention will become more apparent from the following description when taken in connection with the accompanying drawing which shows, for purposes of illustration only, two embodiments in accordance with the present invention, and wherein:

Figure 1:
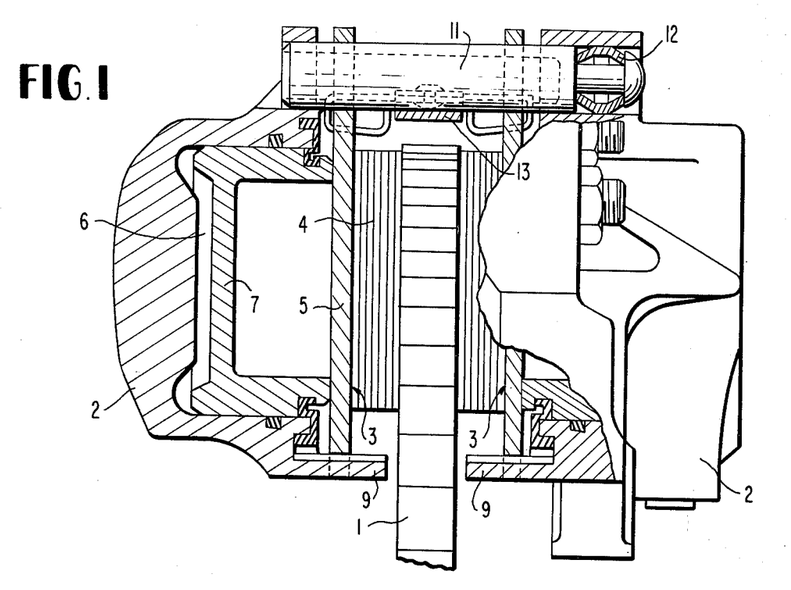
FIG. 1 is an elevational view, partially in cross section, of a first embodiment of a fixed saddle brake in accordance with the present invention, in which the radially outer guide member consists of a bolt.
Figure 2:
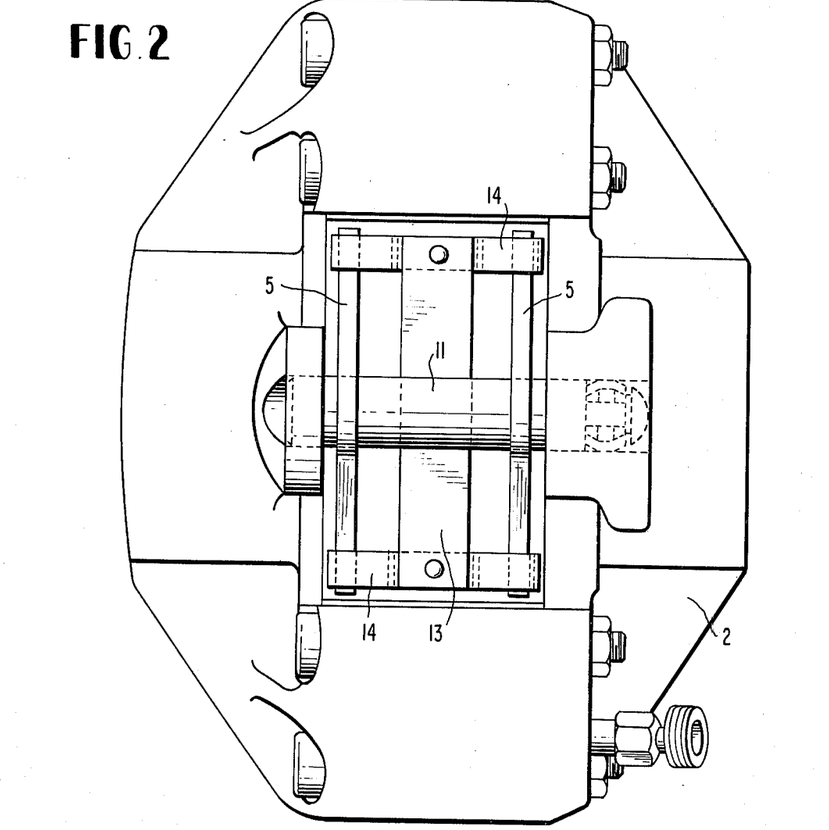
FIG. 2 is a top plan view of the fixed saddle brake of FIG. 1.
Figure 3:
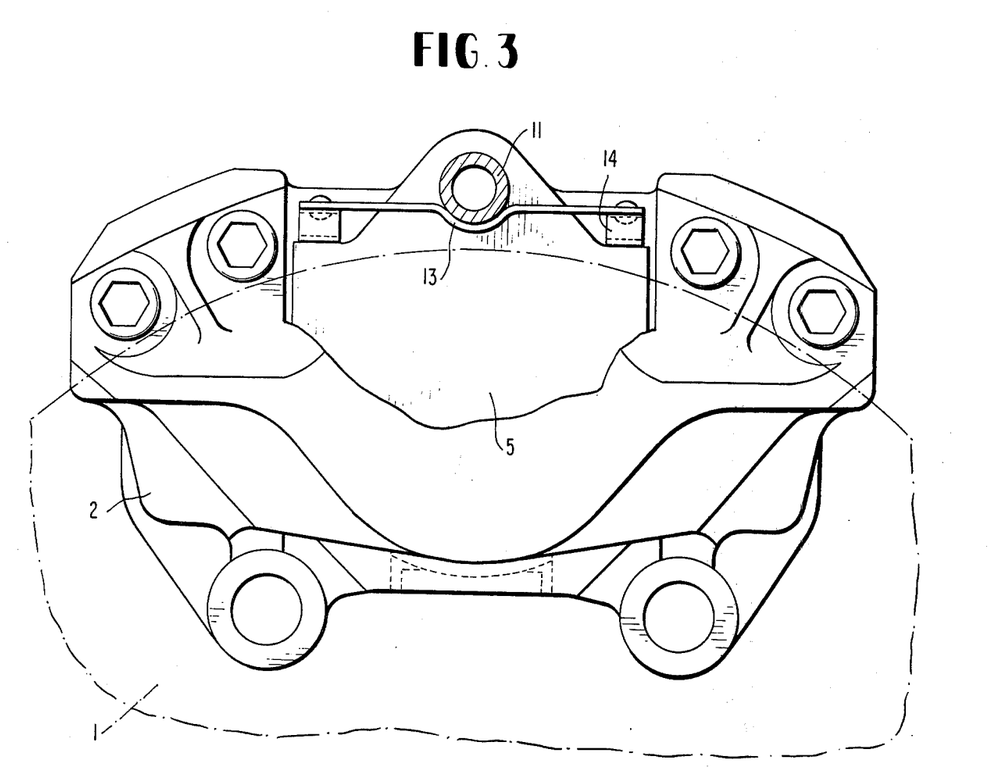
FIG. 3 is a right side elevational view of the saddle brake of FIG. 2.

Referring now to the drawing wherein like reference numerals are used throughout the various views to designate like parts, and more particularly to FIGS. 1 to 3, in the partial lining-fixed saddle disk brake illustrated in these figures, the disk brake 1 is externally surrounded by a U-shaped brake housing 2. Brake cushions or pads generally designated by reference numeral 3 are arranged on each side of the brake disk 1 which consists of a brake lining 4 and of a brake lining carrier or support 5. The brake housing 2 forms on each side of the brake disk 1 a brake cylinder 6 in which is accommodated a hydraulically actuated piston 7.

Figure 4:
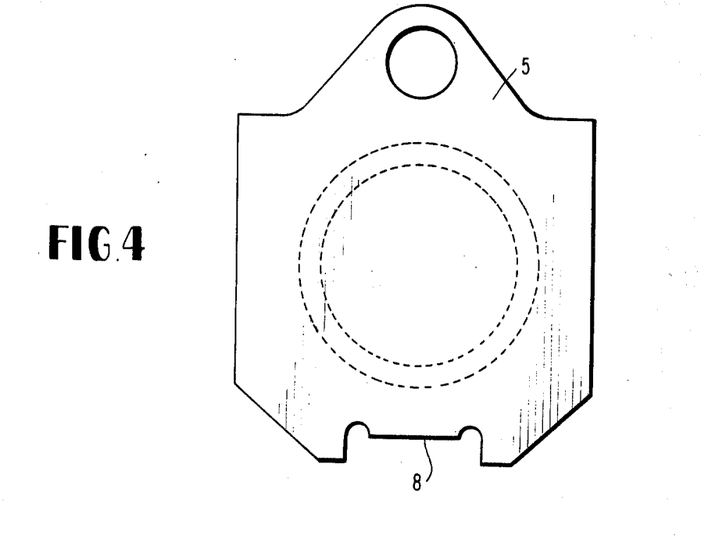
FIG. 4 is an elevational view of a brake lining carrier for the fixed saddle brake of FIGS. 1 to 3.

On the side of the brake lining carrier 5 facing the brake disk axis, the brake lining carrier 5 is provided with a recess 8 (FIG. 4), into which engages respectively a tongue 9. This tongue 9 forms also the inner guide member, as viewed in the radial direction, at which the brake lining 4 supports itself in its center. This tongue 9 represents a part of the brake housing 2 itself, which projects from the latter in the direction toward the brake disk 1.

A further guide member which supports the brake cushion in its center from the outside, as viewed in the radial direction, is formed by a bolt 11 which is extended in the axial direction of the brake disk 1 through mutually aligned bores arranged in the brake housing 2 and in the brake lining carrier 5. This bolt 11 is secured against falling out by conventional locking washers 12 or the like. A leaf spring 13 (FIG. 3) engaging the bolt 11 from below is arranged above the brake disk 1. Support plates 14 (FIGS. 2 and 3) are riveted to the free ends of this leaf spring 13 which press against lateral end surfaces of the brake cushions 3.

By reason of the fact that the brake linings 4 of the partial lining disk brake are supported to the center, i.e., in proximity to the center plane of the brake cushions 3 which extends through the brake disk axis, a tilting moment which inclines the brake cushion with respect to the brake disk surface, can no longer occur. The brake cushion 3 is therefore pressed against the brake disk surface plane parallel with respect to the latter and is worn completely uniformly during braking.

Figure 5:
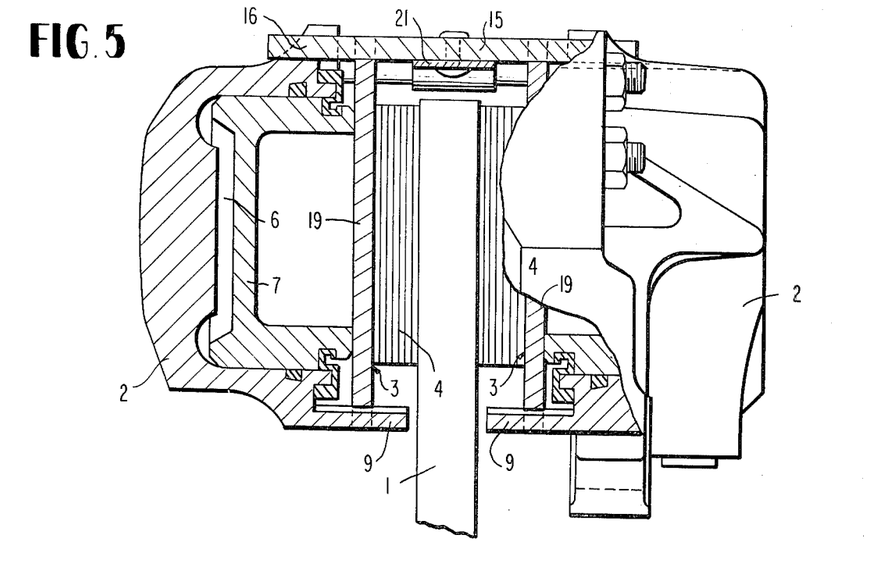
FIG. 5 is an elevational view, partially in cross section, of a modified embodiment of a fixed saddle brake in accordance with the present invention, in which the radially outer guide member is secured by pins inserted into the housing.
Figure 6:
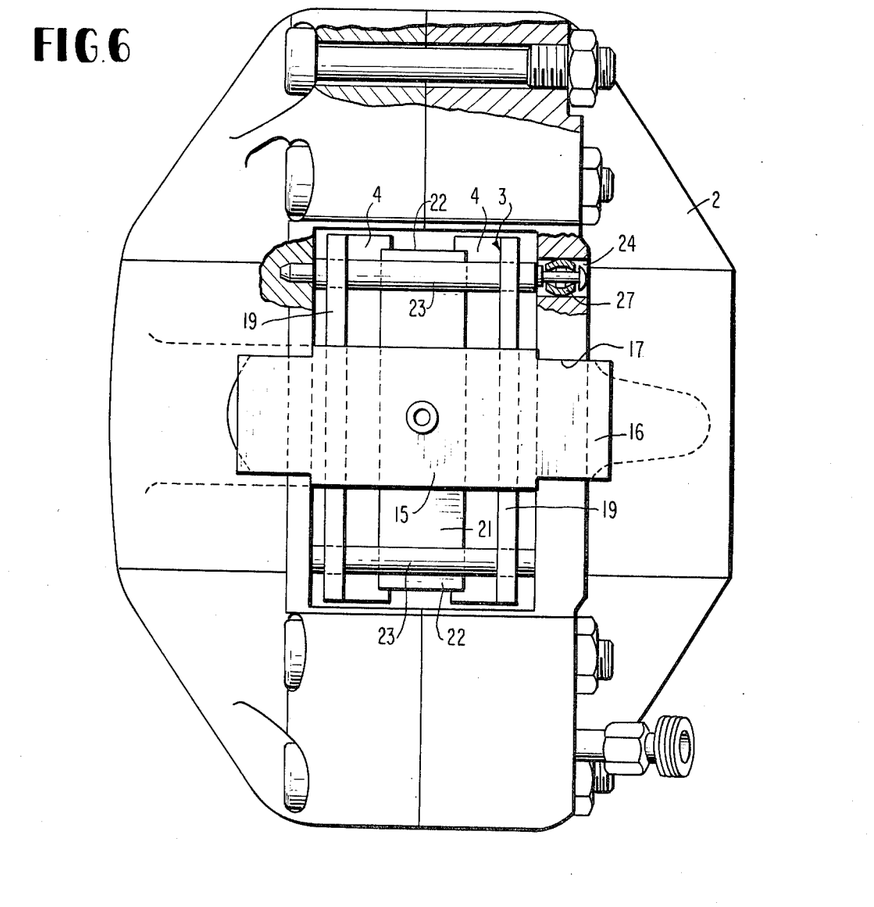
FIG. 6 is a top plan view of the fixed saddle brake of FIG. 5.
Figure 7:
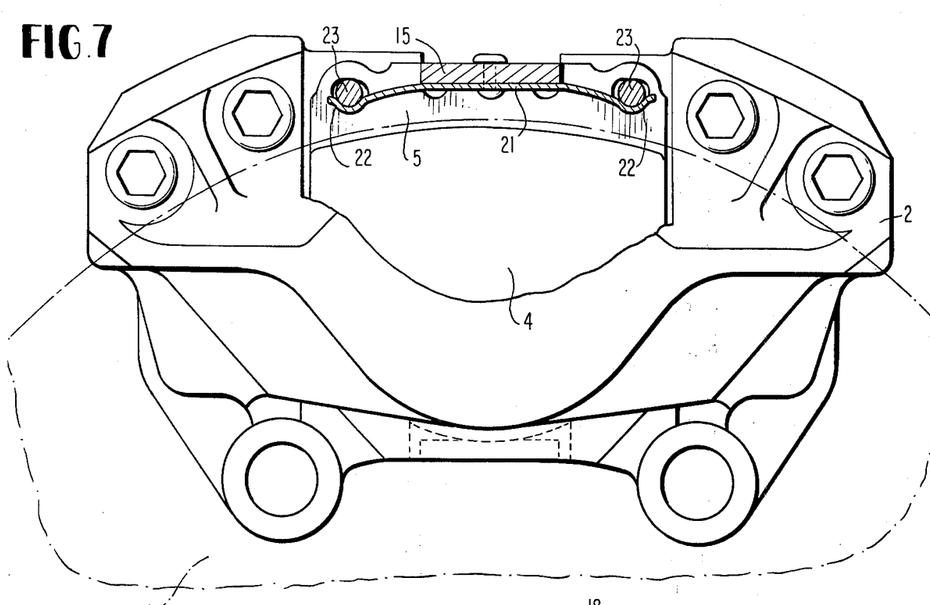
FIG. 7 is a right side elevational view of the fixed saddle brake of FIG. 6, with parts thereof broken away for the sake of clarity.
Figure 8:
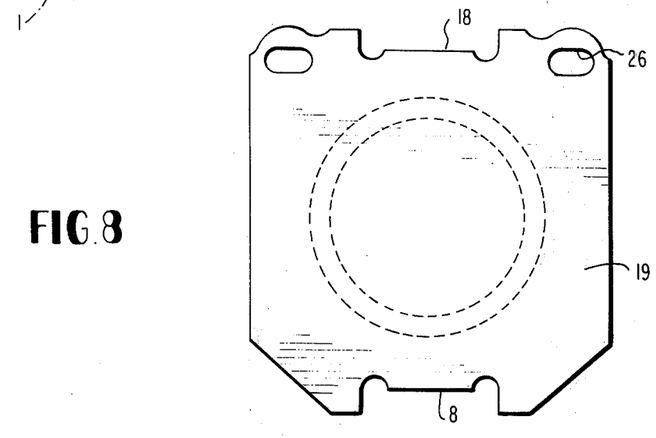
FIG. 8 is an elevational view of a brake cushion which can be used with the embodiment according to FIGS. 5 to 7.

The embodiment illustrated in FIGS. 5 to 7 of a partial lining fixed saddle disk brake includes a guide member engaging at the brake cushion 3 from the inside, as viewed in the radial direction, in a radially inner recess 8 provided in the brake lining carrier 19 (FIG. 8); this guide member, exactly as in the preceding embodiment, is formed by a tongue 9. The guide member 15 (FIGS. 5 and 6) which, as viewed in the radial direction, engages from the outside at the brake cushion consists of a metal plate 15 whose free ends 16 are inserted in correspondingly constructed grooves 17 (FIG. 6) provided in the brake housing 2. As to the rest, the guide member 15 engages in radially outer recesses 18 (FIG. 8) provided in the brake lining carrier 19. A leaf spring 21 (FIGS. 5 and 7) is riveted to the guide member 15, whose free ends 22 (FIGS. 5, 6 and 7) engage pins 23 from below which are inserted into corresponding bores 24 (FIG. 6) provided in the brake housing 2 and extend through elongated apertures 26 (FIG. 8) provided in the brake lining carrier 19. The pins 23 are secured in the bores 24 by conventional locking washers 27 or the like. Also in this embodiment, the moments which might occur during braking, are compensated for by the central support of the brake linings. The brake cushions therefore cannot be positioned obliquely, i.e., at an angle, and consequently wear uniformly.

Figure 9:
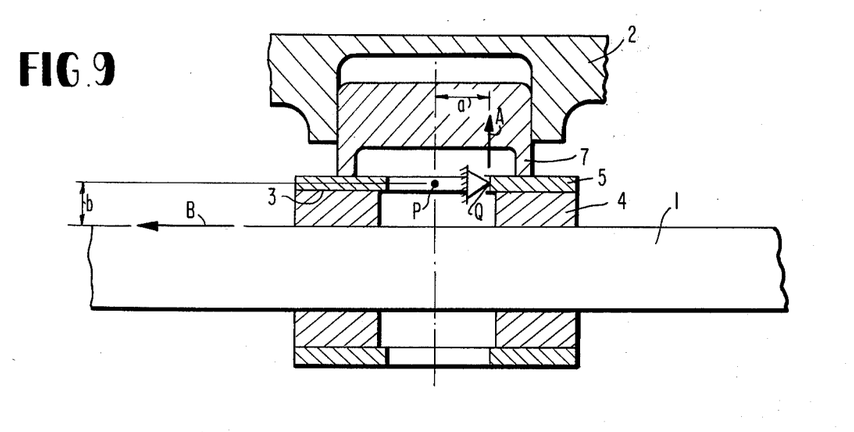
FIG. 9 is a diagram explaining the moment conditions during braking.

In order to illustrate in detail how the moments occurring during the braking are compensated for and how the inclination or angular positioning of the brake lining is avoided as a result thereof, reference is made to the schematic view in FIG. 9. It can be seen from FIG. 9 how large has to be the distance $a$ of the point of support Q from the pole P for the moment engagement, if one considers the following moment equations:

$$B \cdot b = A \cdot a = 0$$

$$A_{friction\ force} = B \cdot \mu_{carrier}$$

$$a_{required} = \frac{B \cdot b}{B \cdot \mu_{carrier}}$$

$$A = \frac{b}{\mu_{carrier}}$$

However, $a$ is dependent exclusively from $b$ and from the coefficient of friction $\mu$ between the guide member 15 and the brake lining carrier 5. For determining the distance $a$, a mean distance $b$ is selected with a view toward the wear of the brake lining 4.

Figure 10:
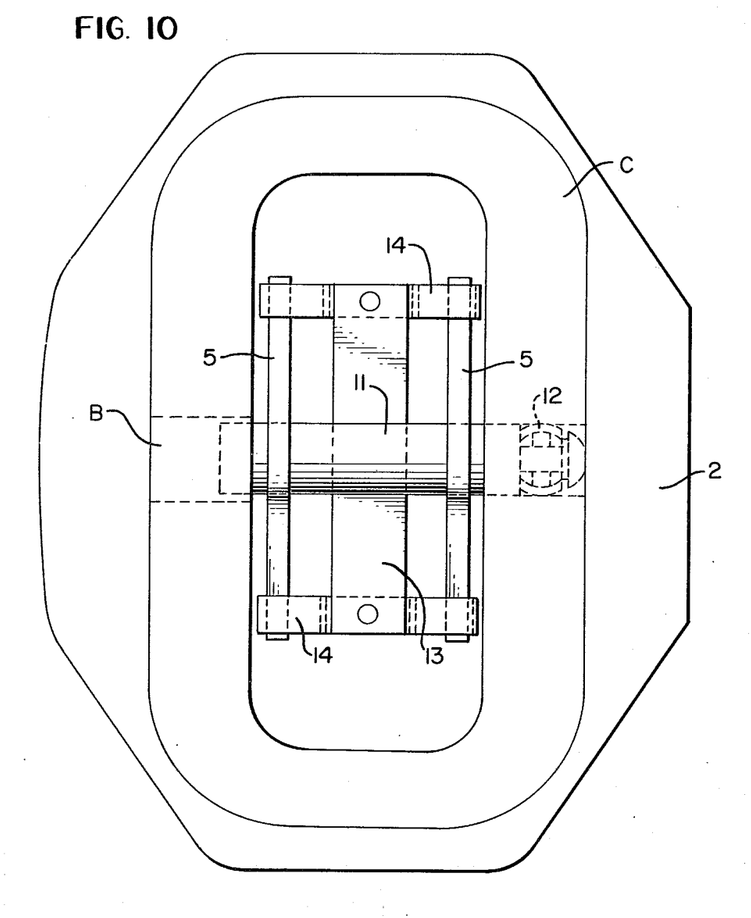
FIG. 10 is a top plan view of one embodiment of a floating saddle brake in accordance with the present invention.
Figure 11:
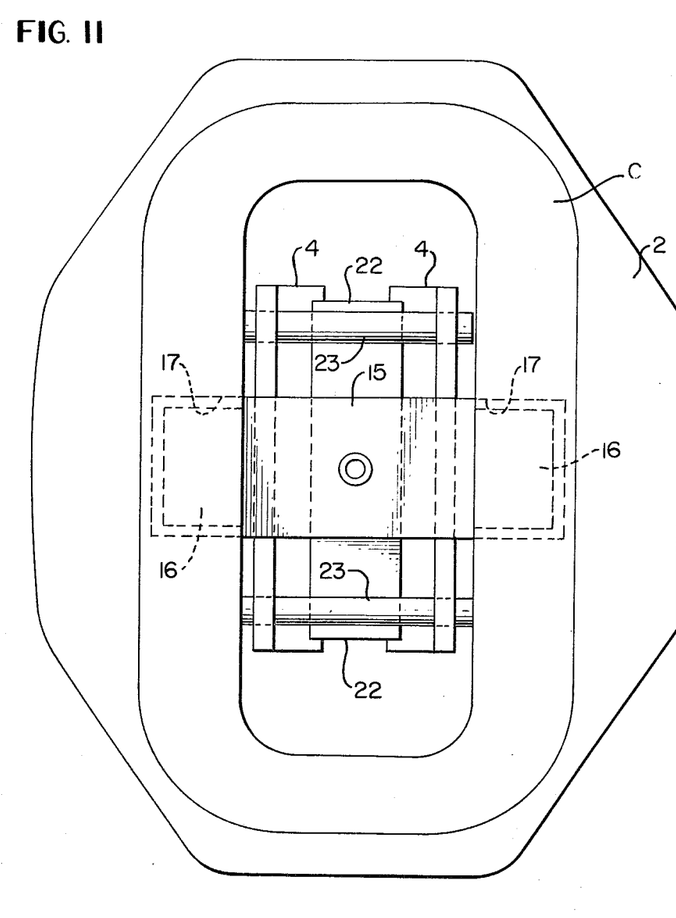
FIG. 11 is a top plan view of a further embodiment of a floating saddle brake in accordance with the present invention.

The present invention can also be applied with the same advantages to floating saddle brakes. In this case the guide members, at which the brake cushions are supported by reason of a central recess, are formed by the floating saddle itself as tongues as in the illustrated embodiments or are so secured at the floating saddle as outer guide members, as viewed in the radial direction, that they can be removed thereat for the exchange of the brake cushions or pads. Specifically, as shown in FIG. 10, the bolt 11 forming the outer guide means overlapping the brake disc extends in the axial direction of the brake disc through mutually aligned bores B arranged at a floating saddle C with a locking washer 12 or the like securing the bolt 11 against inadvertant falling out. A leaf spring 13 is arranged above each brake pad carrier 5 with support plate 14 being riveted to the free ends of the leaf spring 13 which press against the lateral or upper surfaces of the brake cushions. In the construction of FIG. 11, the free ends 16 of the guide member 15 are inserted in correspondingly constructed grooves provided at the floating saddle C with the free ends 22 of the leaf spring, riveted to guide member 15, engaging the pins 23 from below. Possibly the brake cushions may also be constructed with projections which engage in corresponding grooves in the floating saddle or in the brake carrier.

In the embodiments described herein, the moments which occur during braking, are compensated for by the support of the brake cushions in accordance with the present invention. The jamming or wedging forces between piston and cylinder wall are thereby reduced to nearly zero. An inclined wear of the brake lining does not occur during braking either while driving forwards or while driving backwards. A further advantage which the present invention entails, resides in that the brakes for the right and the left side of the vehicles are completely identical. Additionally, the supporting surface of the pressure piston which acts on the lining, is a complete circular surface. The squeaking tendency is reduced in the brakes according to the present invention both while driving in the forward and especially also in the backward direction. Notwithstanding the central support of the brake linings, the latter can be inserted and exchanged radially from the outside as usual in a simple manner. The support principle according to the present invention is applicable both to fixed saddle brakes as also to floating saddle brakes.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A partial lining disk brake arrangement including a brake disk, a U-shaped brake housing means surrounding the brake disk, the arrangement comprising: hydraulically actuated brake cushion means disposed on each side of the brake disk, said brake cushion means including brake pad means and carrier means for carrying said brake pad means, a pair of guide means for axially displacably supporting each of said brake pad carrier means, said guide means being arranged in a center plane of the brake disk which extends vertically through the axis of the brake disk, the first of said pair of guide means supporting the brake pad carrier means from the outside as viewed in the radial direction including a single guide member extending in the axial direction of the brake disk above the radially outermost portion thereof, at least a portion of said single guide member being disposed in the center plane of the brake disk, bore means provided in said brake pad carrier means at the upper edge thereof for receiving said guide member, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, the single guide member is detachably secured at the housing means and consists of a bolt means, aligned bores are provided in the brake housing means for receiving the free ends of said bolt means, the aligned bores in the brake housing means are in alignment with the bore means in the brake pad carrier means, means are provided for securing the bolt means against inadvertent falling out, and a leaf spring means is arranged above each brake pad carrier means which engages the bolt means from below, the free ends of the leaf spring means pressing against lateral end surfaces of the brake pad carrier means.

2. A partial lining disk brake arrangement including a brake disk, and a U-shaped brake housing means surrounding the brake disk, the arrangement comprising: hydraulically actuated brake cushion means disposed on each side of the brake disk, said brake cushion means including brake pad means and carrier means for carrying said brake pad means, a pair of guide means for axially displaced supporting each of said brake pad carrier means, said guide means being arranged in a center plane of the brake disk which extends vertically through the axis of the brake disk, the first of said pair of guide means supporting the brake pad carrier means from the outside as viewed in the radial direction including a single guide member extending in the axial direction of the brake disk above the radially outermost portion thereof, at least a portion of said single guide member being disposed in the center plane of the brake disk, recess means provided in said brake pad carrier means at the upper edge thereof for receiving said guide member, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, and the single guide member is inserted into recess means in the brake housing means which are aligned with the recess means in the brake pad carrier means, a leaf spring is fastened at the single guide member to secure the same against falling out, and an additional guide pin extending in the axial direction of the brake disk is provided on each side of the center plane, the guide pins being removably inserted in the brake housing means, the leaf spring means with its free ends engaging the guide pins from below.

3. A partial lining disk brake arrangement including a brake disk, and a U-shaped brake housing means surrounding the brake disk, the arrangement comprising: hydraulically actuated brake cushion means disposed on each side of the brake disk, said brake cushion means including brake pad means and carrier means for carrying said brake pad means, a pair of guide means for axially displaceably supporting each of said brake pad carrier means, said guide means being arranged in a center plane of the brake disk which extends vertically through the axis of the brake carrier disk, the first of said pair of guide means supporting the brake pad carrier means from the outside as viewed in the radial direction including a single guide member consisting of a bolt means extending in the axial direction of the brake disk above the radially outermost portion thereof, at least a portion of said bolt means being disposed in the center plane of the brake disk, bore means provided in said brake pad carrier means at the upper edge thereof for receiving said bolt means, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, the brake housing means includes a floating saddle means, the tongue portions projecting in the axial direction of the brake disk are formed by the brake housing means, said bolt means being detachably secured at the floating saddle means in mutually aligned bores arranged in the brake housing means in alignment with the bore means provided in the brake pad carrier means, means for securing said bolt means against inadvertent falling out, and a leaf spring means is arranged above each brake pad carrier means which engages the bolt means from below, the free ends of the leaf spring means pressing against upper end surfaces of the brake pad carrier means.

4. A partial lining disk brake arrangement including a brake disk, a U-shaped brake housing means surrounding the brake disk, the arrangement comprising: hydraulically actuated brake cushion means disposed on each side of the brake disk, said brake cushion means including brake pad means and carrier means for carrying said brake pad means, a pair of guide means for axially displaceably supporting each of said brake pad carrier means, said guide means being arranged in a center plane of the brake disk which extends vertically through the axis of the brake disk, the first of said pair of guide means supporting the brake pad carrier means from the outside as viewed in the radial direction including a single guide member extending in the axial direction of the brake disk above the radially outermost portion thereof, at least a portion of said single guide member being disposed in the center plane of the brake disk, recess means provided in said brake pad carrier means at the upper edge thereof for receiving said guide member, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, the brake housing means includes a floating saddle, the tongue portions projecting in the axial direction of the brake disk are formed by the brake housing means, the single guide member is detachably inserted into recess means in the floating saddle, said recess means in the floating saddle being aligned with the recess means in the brake pad carrier means, a leaf spring means is fastened at the single guide member to secure the same against falling out, and an additional guide pin extending in the axial direction of the brake disk is provided on each side of the center plane, the guide pins being removably inserted in the brake housing means, the leaf spring means with its free ends engaging the guide pins from below.

5. A partial lining disk brake arrangement including a brake disk, and a U-shaped brake housing means surrounding the brake disk, the arrangement comprising: hydraulically actuated brake cushion means disposed on each side of the brake disk, said brake cushion means including brake pad means and carrier means for carrying said brake pad means, a pair of guide means for axially displaceably supporting each of said brake pad carrier means, said guide means being arranged in a center plane of the brake disk which extends vertically through the axis of the brake disk, the first of said pair of guide means supporting the brake pad carrier means from the outside as viewed in the radial direction including a single guide member consisting of a bolt means extending in the axial direction of the brake disk above the radially outermost portion thereof, at least a portion of said bolt means being disposed in the center plane of the brake disk, bore means provided in said brake pad carrier means at the upper edge thereof for receiving said bolt means, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, aligned bores are arranged in the brake housing means for receiving the free ends of said bolt means, the aligned bores in the brake housing means are in alignment with the bore means provided in the brake pad carrier means, means for securing the bolt means against inadvertent falling out, and a leaf spring means is arranged above each brake pad carrier means which engages the bolt means from below, the free ends of the leaf spring means pressing against upper end surfaces of the brake pad carrier means.

6. A partial lining disk brake arrangement including a brake disk, and a U-shaped brake housing means surrounding the brake disk, the arrangement comprising: hydraulically actuated brake cushion means disposed on each side of the brake disk, said brake cushion means including brake pad means and carrier means for carrying said brake pad means, a pad of guide means for axially displaceably supporting each of said brake pad carrier means, said guide means being arranged in a center plane of the brake disk which extends vertically through the axis of the brake disk, the first of said pair of guide means supporting the brake pad carrier means from the outside as viewed in the radial direction including a single guide member extending in the axial direction of the brake disk above the radially outermost portion thereof, at least a portion of said single guide member being disposed in the center plane of the brake disk, bore means provided in said brake pad carrier means at the upper edge thereof for receiving said guide member, the second of said pair of guide means supporting said brake pad carrier means from the inside as viewed in the radial direction including a tongue portion provided on each side of said brake disk extending in the axial direction thereof, at least a portion of each of said tongue portions being disposed in the center plane of the brake disk, a recess provided at the lower edge of said brake pad carrier means for receiving said tongue portions, said single guide member includes a bolt means, said brake housing means being provided with bore means aligned with said bore means of said brake pad carrier means for receiving the free ends of said bolt means, and spring means arranged above said brake pad carrier means and engaging said bolt means and said brake pad carrier means.

7. A partial lining disk brake according to claim 6, wherein said spring means is a leaf spring extending transversely to the axis of the brake disk, said leaf spring substantially in the central portion thereof engaging said bolt means from the underside thereof, and support plate means provided at the free ends of said leaf spring, said support plate means pressing against the upper edge surfaces of each of said pad carrier means.

8. A brake arrangement including a brake disk, and a U-shaped brake housing means surrounding the brake disk, the arrangement comprising: hydraulically actuated brake cushion means disposed on each side of the brake disk, said brake cushion means including a brake pad means and carrier means for carrying said brake pad means, a pair of guide means for axially displaceably supporting each of said carrier means, said guide means being arranged in a center plane of said carrier means extending through the axis of the brake disk, the first of said pair of guide means supporting said carrier means from the outside as viewed in the radial direction, the second of said pair of guide means supporting said carrier means from the inside as viewed in the radial direction, the first of said pair of guide means includes a guide member extending in the axial direction of the brake disk above the radially outermost portion of the brake disk, at least a pair of spaced guide elements extending in the axial direction of the brake disk above the radially outermost portion of the brake disk, groove means provided in said brake housing means for receiving the free ends of said guide member, aligned bore means provided in the brake housing means for receiving the free ends of the spaced guide elements, bore means provided in said carrier means for accommodating said spaced guide elements, recess means provided in said carrier means for receiving said guide member, leaf spring means extending transversely of the axis of the brake disk means, the free ends of said leaf spring means engaging said spaced guide elements, and means for securing the spring means to said guide member, and wherein said second of said pair of guide means includes on each side of the brake disk a tongue portion provided on the brake housing means projecting toward the brake disk, and recess means provided in each of said carrier means for receiving said projecting tongue portion.

* * * * *